United States Patent
Coutts et al.

(10) Patent No.: US 7,519,653 B1
(45) Date of Patent: Apr. 14, 2009

(54) SELF-SERVICE TERMINALS IN WHICH REMOTE PARTIES CAN INDUCE OPERATION OF PERIPHERAL DEVICES WITHOUT OBTAINING CONTROL OVER THE PERIPHERAL DEVICES

(75) Inventors: Michael G. Coutts, Dundee (GB); Lee G. Dove, Coupar Angus (GB)

(73) Assignee: NCR Corporation, Dayton, OH (US)

( * ) Notice: Subject to any disclaimer, the term of this patent is extended or adjusted under 35 U.S.C. 154(b) by 550 days.

(21) Appl. No.: 09/691,553

(22) Filed: Oct. 18, 2000

(30) Foreign Application Priority Data

Oct. 21, 1999 (GB) ................................. 9924787.6

(51) Int. Cl.
*G06F 15/16* (2006.01)
*G06F 15/173* (2006.01)
*G06F 15/177* (2006.01)

(52) U.S. Cl. ...................... 709/203; 705/41; 235/381; 715/702

(58) Field of Classification Search ......... 709/200–203, 709/217–224; 705/40–44; 235/381; 715/702
See application file for complete search history.

(56) References Cited

U.S. PATENT DOCUMENTS

| 5,305,195 | A | | 4/1994 | Murphy |
| 5,602,905 | A | | 2/1997 | Mettke |
| 5,650,604 | A | * | 7/1997 | Marcous et al. ............. 235/379 |
| 5,850,442 | A | * | 12/1998 | Muftic ......................... 705/65 |
| 5,870,724 | A | * | 2/1999 | Lawlor et al. ................. 705/42 |
| 5,922,053 | A | * | 7/1999 | Okada ......................... 709/238 |
| 5,933,811 | A | * | 8/1999 | Angles et al. ................. 705/14 |
| 5,933,816 | A | | 8/1999 | Zeanah et al. |
| 5,945,975 | A | * | 8/1999 | Lundrigan et al. ............. 345/24 |
| 6,023,688 | A | * | 2/2000 | Ramachandran et al. ...... 705/44 |
| 6,038,492 | A | * | 3/2000 | Nichols et al. ............... 700/232 |
| 6,195,694 | B1 | * | 2/2001 | Chen et al. ................... 709/220 |
| 6,216,115 | B1 | * | 4/2001 | Barrameda et al. ............ 705/40 |
| 6,256,046 | B1 | * | 7/2001 | Waters et al. ................ 345/473 |
| 6,289,320 | B1 | * | 9/2001 | Drummond et al. ........... 705/35 |
| 6,311,165 | B1 | * | 10/2001 | Coutts et al. .................. 705/21 |
| 6,381,626 | B1 | * | 4/2002 | De Leo et al. .............. 709/200 |

(Continued)

FOREIGN PATENT DOCUMENTS

EP 0 961 250 A2 12/1999

(Continued)

*Primary Examiner*—Haresh N Patel
(74) *Attorney, Agent, or Firm*—Gregory A. Welte (57) ABSTRACT

A self-service terminal system (10) is described. The system (10) has a plurality of terminals (14 or 214), each terminal comprising a user interface (30) and a terminal application (38) for controlling the user interface (30). Each terminal (14 or 214) has a link (16) to a remote server (12 or 212) storing a server application (104 or 260) for issuing to the terminal application (38) requests for using the user interface (30). A user of one of the terminals (14 or 214) is able to access the server application (104 or 260) from the terminal (14 or 214). The server application (104 or 260) is able to use one or more of the facilities (50, 56, 58) provided by the user interface (30). Each terminal is operable to select between presenting the terminal application or the server application to a user. A method of hosting a third party application on a self-service terminal is also described.

4 Claims, 8 Drawing Sheets

U.S. PATENT DOCUMENTS

| | | | |
|---|---|---|---|
| 6,414,958 B1* | 7/2002 | Specht | 370/395.53 |
| 6,494,363 B1* | 12/2002 | Roger et al. | 235/379 |
| 6,507,871 B1* | 1/2003 | Kim | 709/230 |
| 6,567,842 B2* | 5/2003 | De Leo et al. | 709/200 |
| 6,598,023 B1* | 7/2003 | Drummond et al. | 705/1 |
| 6,630,941 B1* | 10/2003 | Addison | 715/702 |
| 6,659,342 B2* | 12/2003 | Birnie | 235/379 |
| 6,681,031 B2* | 1/2004 | Cohen et al. | 382/103 |
| 6,945,457 B1* | 9/2005 | Barcelou | 235/380 |
| 2001/0014881 A1* | 8/2001 | Drummond et al. | 705/43 |
| 2001/0029528 A1* | 10/2001 | Coutts et al. | |
| 2002/0004781 A1* | 1/2002 | Forsyth | |
| 2002/0036231 A1* | 3/2002 | Monaghan et al. | |
| 2002/0038289 A1* | 3/2002 | Lawlor et al. | 705/42 |
| 2002/0074394 A1* | 6/2002 | Birnie | |
| 2002/0099634 A1* | 7/2002 | Coutts et al. | 705/35 |
| 2002/0099658 A1* | 7/2002 | Nielsen et al. | |
| 2005/0109842 A1* | 5/2005 | Walker et al. | 235/381 |

FOREIGN PATENT DOCUMENTS

| | | |
|---|---|---|
| GB | 2 319 102 A | 5/1998 |
| WO | WO 97 13228 A | 4/1997 |
| WO | WO 97/45796 A1 | 12/1997 |
| WO | WO 99/49431 A2 | 9/1999 |

* cited by examiner

FIG. 7
150 → http://domain name/directory?command
    152        154            156    158

FIG. 8
160 → http://www.xyzairline.com/information?port=6000&ip=123.45.78.78
    152          162              164         166         168

FIG. 9
170 → "print=XYZairline\r\n 1500 Air Miles\r\n"
    172          176    178              176   178
                      174

FIG. 10
180 → http:// www.xyzairline.com/information?print=pending
    152            162              164          182

SELF-SERVICE TERMINALS IN WHICH REMOTE PARTIES CAN INDUCE OPERATION OF PERIPHERAL DEVICES WITHOUT OBTAINING CONTROL OVER THE PERIPHERAL DEVICES

CROSS-REFERENCE TO RELATED APPLICATIONS

This application claims the priority of Great Britain Application Serial No. 9924787.6 filed on Oct. 21, 1999, now abandoned.

FIELD OF INVENTION

The present invention relates to self-service terminals (SSTs). In particular, the present invention relates to self-service terminals for hosting third party applications. The invention has particular relevance to automated teller machines (ATMs).

BACKGROUND OF THE INVENTION

Owners of ATMs sometimes attempt to offset the high cost of owning and maintaining an ATM by renting out screen space to third parties, such as vendors, for displaying advertisements for the goods and/or services provided by the third party. Third parties lease screen space because it enables them to advertised their goods and/or services to ATM customers without having the expense of owning and maintaining an ATM.

One problem associated with renting out screen space to third parties is that the ATM application that controls the flow of screens presented to a user of the ATM is very complex. This makes it very difficult and time consuming to modify the application. As a result, owners of ATMs are reluctant to allow the third parties to change the advertisements too frequently. For some third party vendors, the goods or services that they advertise via the ATM may have limited availability, or the price of the goods and/or services may change frequently. This means that it may not be convenient to advertise the goods and/or services as part of a long term advertisement.

Another problem associated with renting out screen space to third parties is that the third party is not able to access the peripherals (for example, the printer, card reader, currency deposit module, and such like) within the ATM. One reason for this is that the ATM only allows secure access to its peripherals to protect against fraud. Another reason is that the ATM provides inherent resilience to ensure that the ATM remains operational even if a minor fault develops. Thus, any third party advertisement or other application cannot provide a user of the ATM with a receipt or other printed information and cannot accept payment from a user unless the third party application is made an integral part of the ATM application.

SUMMARY OF THE INVENTION

It is among the objects of one or more embodiments of the invention to obviate or mitigate one or more of the above disadvantages or other disadvantages associated with renting screen space to third parties.

According to a first aspect of the present invention there is provided a self-service terminal comprising: a user interface; and a terminal application for controlling the user interface; characterized in that the terminal has a link to a remote server storing a server application for issuing to the terminal application requests for using the user interface, whereby a user of the terminal is able to access the server application from the terminal, and the server application is able to use one or more facilities provided by the user interface.

The server application comprises means for generating an application flow. The application flow is the sequence of screens or images that are presented to a user of the terminal, and typically comprises graphics and text, and sometimes sounds. Typically, the graphics, text, and sounds that are presented will change depending on one or more inputs from the user. The application flow leads a user through an operation, such as a transaction or a request for information.

Preferably, the user interface includes: user input means, a display, and at least one other peripheral device.

The at least one other peripheral device may be selected from: a printer, a card reader, a cash dispenser, a cash deposit module, or such like.

The terminal application may control the entire operation of the SST, and may include the application flow for the terminal.

By virtue of this aspect of the invention, a third party is able to create and modify a server application (and thereby modify the application flow generated by the server application) independently of the self-service terminal application. Thus, the third party application flow can be updated by the third party as frequently as desired without affecting the SST application flow. By separating the terminal application from the third party application flow, the terminal application is relieved of any requirement to ensure that the third party application flow conforms to the security and reliability requirements of the terminal application.

Also by virtue of this aspect of the invention, the third party is able to interface its server application to any of its proprietary databases or systems, thereby ensuring that a user of the SST can access the full range of information provided by the third party. For example, if the third party is an airline, then the airline's database of flights, ticket availability, and ticket pricing may be available to the server application to ensure that a user of the SST can access the most up-to-date flight and ticketing information available. This also means that the third party does not need to give the owner of the SST access to the third party's proprietary databases and systems except through the server application.

Also by virtue of this aspect of the invention, the server application can be updated centrally at the remote server, rather than locally at each terminal.

Preferably, the link is a network connection for connecting to an EP (internet protocol) network. The IP network may be the public Internet, or a private Intranet, Extranet, or such like.

Preferably, the SST incorporates means for receiving files conforming to a page description language, such as the hypertext markup language (HTML). The means for receiving files conforming to a page description language may be an embedded. Web browser (such as Microsoft (trade mark). Internet Explorer, Netscape (trade mark). Communicator, or such like). Alternatively, the means for receiving files conforming to a page description language may be an embedded HTML component, for example, the Sun (trade mark). HotJava (trade mark) HTML component.

The server application may be executed on the remote server; that is, the server application may be a server-side application. In an alternative embodiment, the server application may be executed on the SST; that is, the server application may be a client-side application.

In embodiments where a server-side application is used, the remote server may provide dynamically generated page description language files, such as Internet Web pages, for supplying to the means for receiving files conforming to a page description language.

The page description language files may be generated using any convenient method. For example, Perl or CGI scripts may be used to generate HTML files. Alternatively, Microsoft (trade mark). Active Server Pages or Sun (trade mark). Java Servlets may be used to generate HTML files. In other embodiments, DHTML (dynamic hypertext markup language) may be used to generate HTML files.

In embodiments where a client-side application is used, the server application may comprise one or more Java Applets and/or ActiveX controls. The Java Applets or ActiveX controls may dynamically generate Internet Web pages and provide these pages to the embedded. Web browser or HTML component in the terminal. The Java Applets or ActiveX controls may be able to access the remote server to provide information requested by the user.

Hypertext links may be embedded within the dynamically generated. Web pages and may point to subsequent dynamic pages, thereby allowing complicated flow-based applications to be constructed.

Preferably, the remote server implements session tracking to maintain an association between the server and the client (the SST).

Preferably, the remote server provides a session object for each client, so that the session object maintains information about the application flow being executed by that client. This gives the server information about the state of the application that is running on the client.

The SST may provide a dedicated user input (such as a push button) for accessing the third party application. Alternatively or additionally, the display may be a touchscreen and the SST may allocate an area of the display for presenting the third party application, whereby, on touching the allocated area the third party application is activated. When the third party application is activated, the terminal may enlarge the allocated area, for example to substantially the full display area.

Preferably, during operation of the third party application the terminal application monitors the terminal usage to ensure that the user is still present and to conduct error handling functions as necessary. If the user abandons the terminal during execution of the server application, then the terminal application may terminate the server application until another user activates the server application.

In some embodiments, more than one third party application may be allocated display area on an SST.

Preferably, the terminal provides a port to which the server application can send requests. This enables the server application to send requests directly to the SST. The advantage of sending requests directly to the SST (rather than via the embedded. Web browser or HTML component being executed by the SST) is increased security.

The terminal can provide local facilities (for example, those facilities provided by the peripherals, such as receipt printing, cash deposit or dispensing, or such like) to the remote server, while ensuring that only the terminal application (not the Web browser or HTML component) has access to the facilities. For example, the terminal may allow the server to request printing of certain data. The terminal receives this request via the port and uses the terminal application to access the printer and to ensure that the data is printed and presented to the user.

Preferably, the terminal provides the server with a response indicating the status of the request; for example, print request accepted, print error, printing completed, and such like.

In some embodiments, only the server may be authorized to issue requests, so that any client-side application must send requests to the terminal via the server. In other embodiments, a client-side application may be able to issue requests directly to the terminal.

According to a second aspect of the invention there is provided a self-service terminal system comprising a remote server interconnected to a plurality of self-service terminals, each terminal having a terminal application, where the remote server stores a server application comprising a third party application flow, so that users of the terminals are able to access the server application from the terminals, and the server application is able to issue requests to the terminal applications to use any peripheral devices incorporated in the terminals.

The system may include an authorization server, where the authorization server is operable to authorize transactions requested by users of the terminals. Alternatively, the remote server may be used to authorize transactions requested by users of the terminals, and also to store the server application comprising a third party application flow.

Preferably, the server application generates files conforming to a page description language.

Preferably, the remote server includes means for supplying the terminals with files conforming to a page description language.

According to a third aspect of the invention there is provided a self-service terminal operable to select one of a plurality of user interface applications for presentation to a user, at least one user interface application being controlled by the owner of the terminal, and at least one user interface application being controlled by a third party, where the user interface application controlled by the third party is operable to request use of facilities controlled by the terminal.

Preferably, the user interface application that is controlled by the owner of the SST is resident on the SST and the user interface application that is controlled by the third party is resident on a remote server.

According to a fourth aspect of the invention there is provided a method of hosting a third party application on a self-service terminal having a terminal application, the method comprising the steps of: providing a link to a server application stored on a remote server; presenting a user with the option of interacting with the server application; in response to a user requesting interaction with the server application, executing the server application and presenting the server application to the user; and monitoring the server application for requests to use facilities controlled by the terminal application.

Preferably, the method includes the further step of: the terminal application monitoring the user's interaction with the server application to detect absence of the user.

Preferably, the method includes the further steps of: on detecting absence of the user, halting the server application, and presenting the terminal application.

Preferably, the step of presenting the server application to the user includes the step of displaying the application flow contained in the server application. Alternatively or additionally, where the application flow consists of or includes an audio file, the step of presenting the server application to the user includes the step of playing the audio file contained in the server application.

According to a fifth aspect of the invention there is provided a self-service terminal system comprising a remote server interconnected to a plurality of self-service terminals, each terminal having a terminal application, where the remote server stores a server application comprising a third party application flow, whereby users of the terminals are able to access the server application from the terminals on a client-server basis, and the server is operable to issue requests to the terminals on a peer-to-peer basis.

Preferably, each terminal application executes a server process to enable peer-to-peer communications between the server and the terminal.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
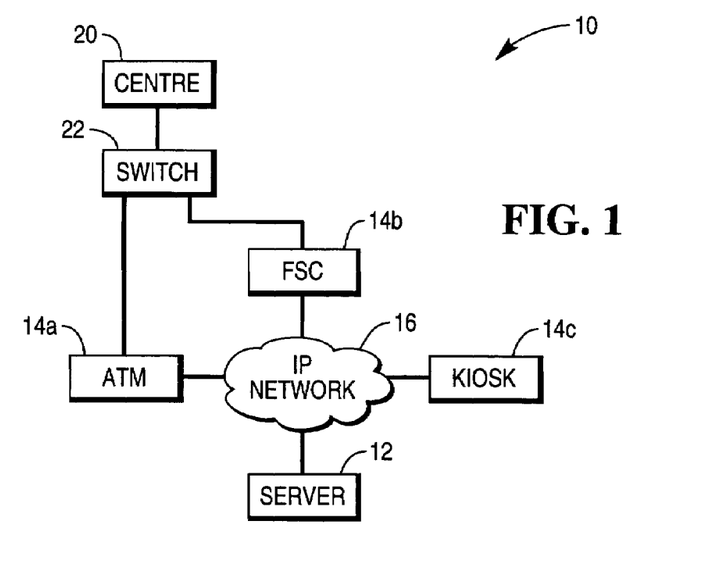
FIG. 1 is a block diagram of a self-service terminal system according to one embodiment of the present invention.

Referring to FIG. 1, there is shown a self-service terminal system 10 comprising a remote server 12 connected to three clients 14 by an IP network 16. Each client 14 is a public-access self-service terminal (SST). The first SST 14*a* is an ATM, the second SST 14*b* is a financial services center (FSC), and the third SST 14*c* is an information kiosk. The network 16 is the Internet. The remote server 12 is owned and operated by an airline ("XYZ Airline"); whereas, the three SSTs 14 are owned and operated by a financial institution.

The ATM 14*a* and the FSC 14*b* are also connected to the financial institution's authorization center 20 via a switching device 22, in a similar way as for conventional ATM networks. The switching device 22 is used for routing financial transaction authorization requests from the ATM 14*a* or FSC 14*b* to the authorization center 20. As will be appreciated by those of skill in the art, the switching device 22 and the authorization center 20 may be incorporated into a single server (an authorization server). It will also be appreciated that the switching device 22 is able to route authorization requests to authorization centers operated by other financial institutions and to financial services companies.

Figure 2:
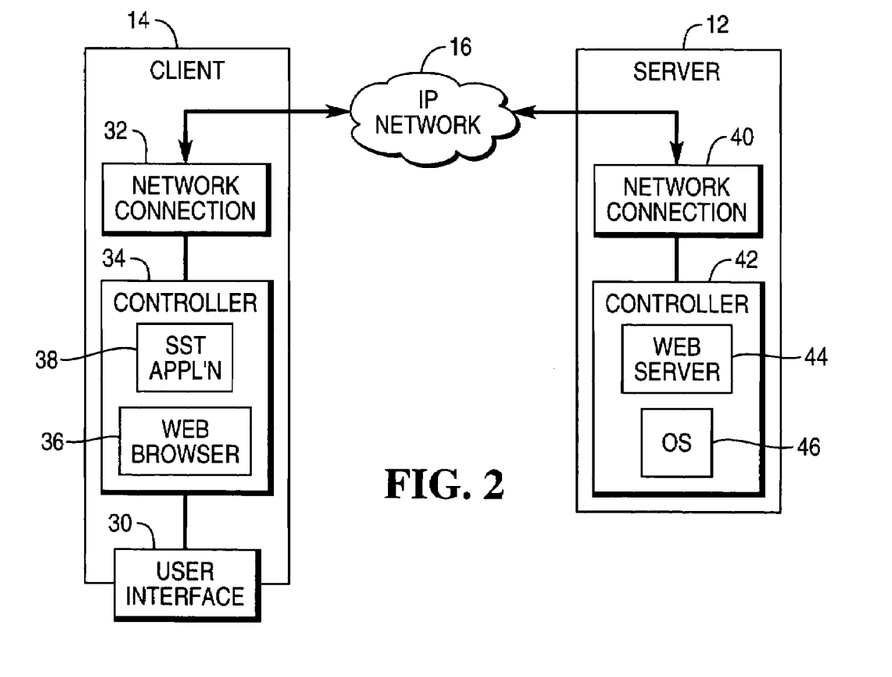
FIG. 2 is a simplified block diagram of one of the self-service terminals and the server of FIG. 1.

Referring to FIG. 2, each SST 14 comprises: a user interface 30, a network connection 32 providing a link to the server 12 via the Internet 16, and a controller 34 for controlling the operation of the SST 14. The controller 34 incorporates means 36 for receiving files conforming to a page description language. The controller 34 also incorporates a terminal application 38 for controlling the terminal 14.

The remote server 12 also has a network connection 40 and a controller 42 incorporating a Web Server 44 and a server operating system 46 for controlling the server 14.

Figure 3:
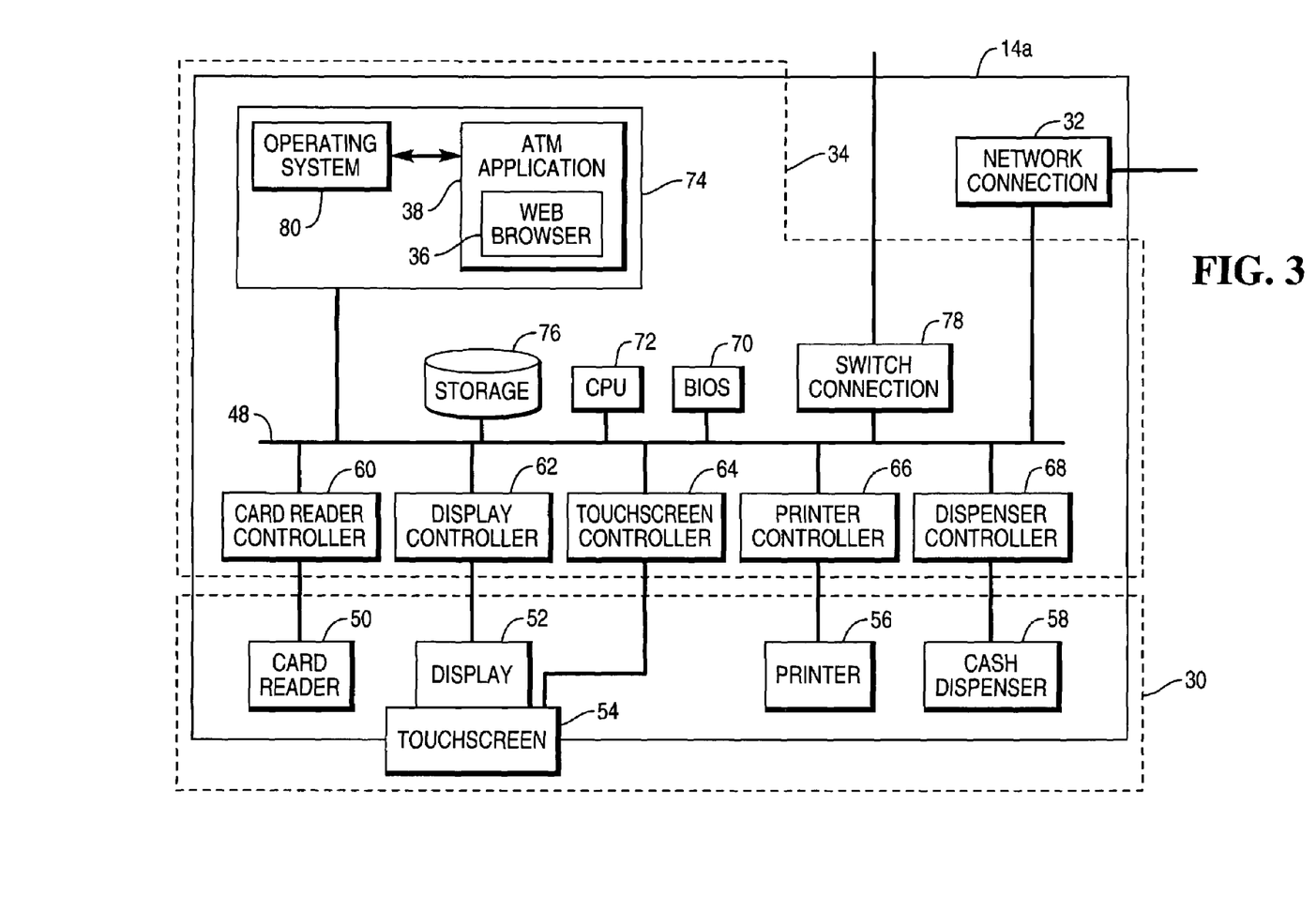
FIG. 3 is a more detailed block diagram of the self-service terminal of FIG. 2.

Referring to FIG. 3, which shows one of the SSTs 14 (ATM 14*a*) in more detail, a system bus (or a plurality of system buses) 48 interconnects the user interface 30, the network connection 32, and the controller 34, to allow mutual intercommunication.

The user interface 30 comprises the following user interface elements (peripheral devices): a card reader 50, a display 52, a touchscreen module 54 mounted onto the display 52, a printer 56, and a cash dispenser 58.

The controller 34 comprises modules for driving the user interface elements 50 to 58, namely: card reader controller 60, display controller 62, touchscreen controller 64, printer controller 66, and dispenser controller 68. These user interface elements (50 to 58) and associated controllers (60 to 68) are standard modules that are used on conventional ATMs and will not be described in detail herein.

The controller 34 also comprises a BIOS 70 stored in non-volatile memory, a microprocessor 72, associated main memory 74, storage space 76 in the form of a magnetic disk drive, and a dedicated switch connection 78 for connecting the ATM 14*a* to the switching device 22 (FIG. 1).

The means for receiving files conforming to a page description language 36 is a HotJava (trade mark) browser bean component which is embedded within the terminal application 38. For simplicity, hereinafter the embedded browser component will be referred to as a browser or a web browser.

In use, the main memory 74 is loaded with the ATM operating system kernel 80, and the ATM application 38 (which is the terminal application) for controlling the operation of the ATM.

Figure 4:
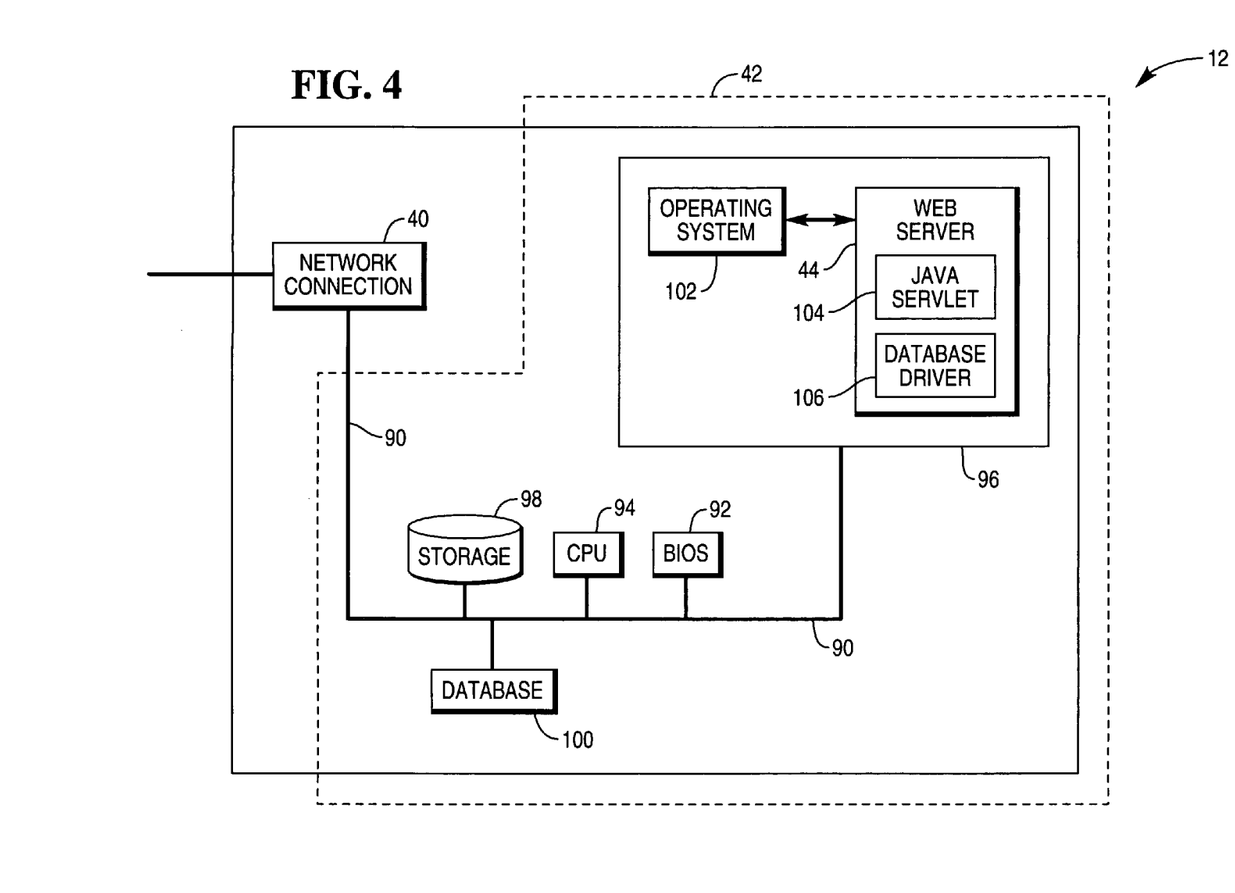
FIG. 4 is a more detailed block diagram of the server of FIGS. 1 and 2.

Referring to FIG. 4, which shows remote server 12 in more detail, a system bus (or buses) 90 connects the network connection 40 to the controller 42. The controller 42 further comprises a BIOS 92 stored in non-volatile memory, a microprocessor 94, associated main memory 96, storage space 98 in the form of a magnetic disk drive, and a database 100 for storing flight ticketing, pricing, and seating availability information for the airline.

The server operating system 46 and the Web server 44 are stored on the magnetic drive 98. In use, the main memory 96 is loaded with the server operating system kernel 102 and the Web server 44. In this embodiment the Web server 44 is the Java Web Server (trade mark).

The Java Web server 44 includes a server application 104 for invoking one or more Java Servlets, and the server 44 supports a database application programming interface (API) 106 in the form of a JDBC (Java DataBase Connectivity) API.

The Java Servlets 104 generate files conforming to a page description language, in this embodiment HTML. The Java Web Server 44 also provides session management, thread management, administration and security features; as is well known to those of skill in the art.

The database application interface 106 is a database driver that provides SQL access to the database 100. The Java Servlets use the JDBC API 106 to obtain information from the database 100 for use in generating HTML files in response to a user request.

A Java Servlet is software code that is used to generate information dynamically. Each Servlet must be registered with the web server so that the web server can distinguish between a request for a Servlet and a request for a web page. When a registered Servlet is requested by a remote web browser, the web server instantiates the Servlet. Once instantiated, the Servlet remains in memory for a period of time awaiting further invocation by the web browser.

Figure 5:
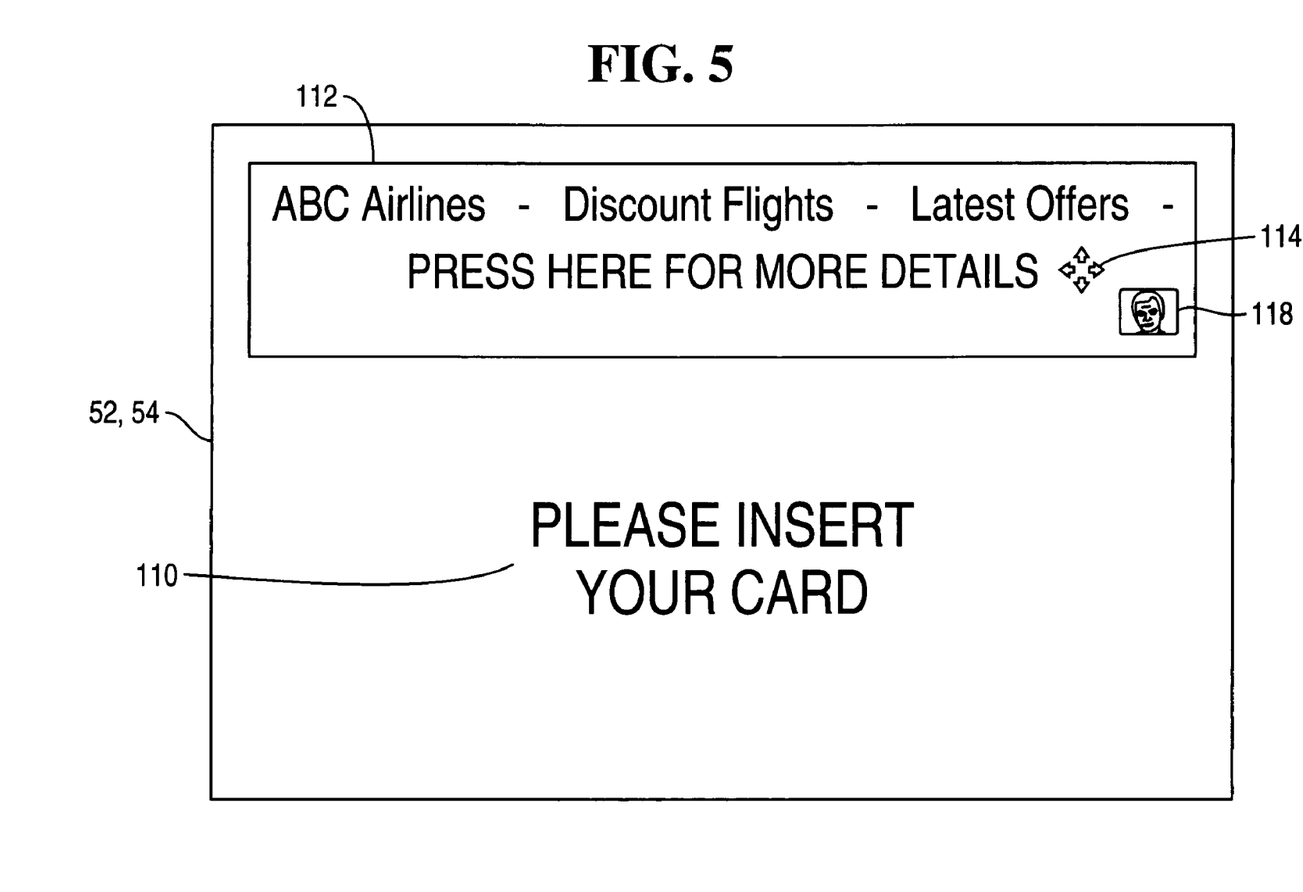
FIG. 5 is a pictorial representation of the screen display of an SST that is hosting a third party application.
Figure 6:
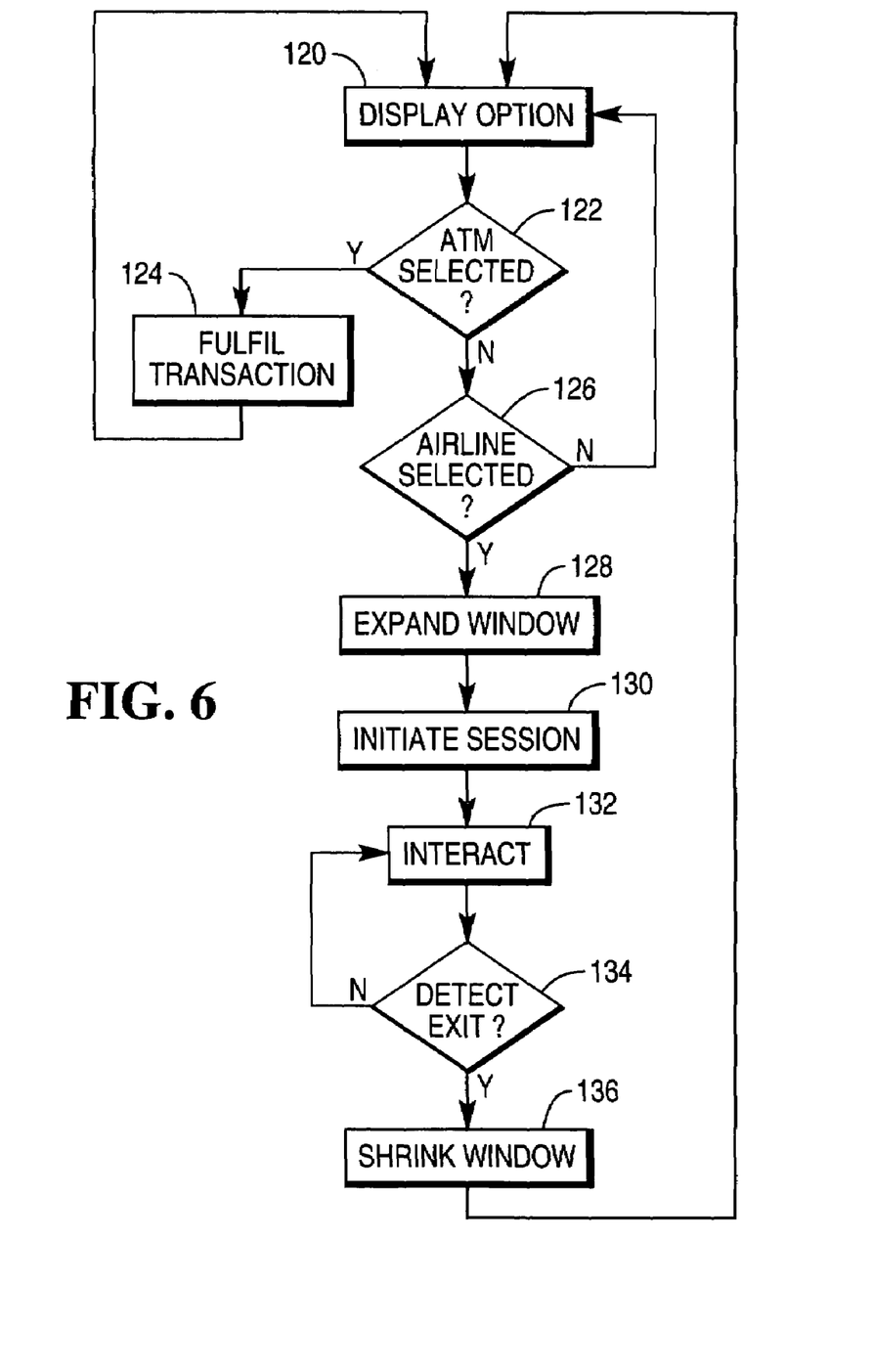
FIG. 6 is a flowchart illustrating the steps involved in an SST hosting a third party application.

The operation of the system of FIG. 1 will now be described with reference to FIGS. 5 and 6. FIG. 5 shows the display 52 and touchscreen 54 having two areas: a background area 110, and a foreground area 112.

The foreground area 112 is a window covering a portion of the background area 110. The web browser 36 (FIGS. 2 and 3) controls the foreground area 112 and monitors that area to detect any user selections.

The background area 110 is a full-screen window that is controlled by the ATM application 38 and is used to display the ATM application flow; whereas, the foreground area 112 is a smaller window that is controlled by the web browser 36 and is used to display an interactive advertisement for a third party, in this embodiment, an airline.

The ATM 14*a* provides a user with the option (step 120 of FIG. 6) of accessing airline information. This is achieved by providing a hypertext link, represented by icon 114, in the foreground area 112. ATM 14*a* simultaneously provides the user with the option (step 120) of conducting an ATM transaction. This is achieved by the ATM 14*a* displaying text on the background area 110 that invites the user to insert his card into the card reader module 50 (FIG. 2).

If a user selects an ATM transaction (step 122) then the transaction is completed (step 124) and the card is returned to the user.

Once an ATM transaction (such as withdraw cash, deposit a check, or such like) is initiated, the terminal application 38 does not allow the web browser 36 to establish a link with the airline application 104. This is to ensure that the user does not access the airline information during a transaction and then leave the ATM 14*a* without completing the transaction and recovering his card.

If a user touches the icon 114 prior to inserting his card, then the web browser 36 detects this (step 126). The web browser expands (step 128) the foreground area 112 to cover substantially the whole screen area of the display 52.

The web browser 36 then establishes a connection (step 130) with the remote server 12, as will be described in more detail below. Once a connection is established, the web browser displays web pages received from the remote server 12. The user can interact (step 132) with these web pages by selecting hypertext links, in a similar manner to a user operating a conventional web browser on a personal computer.

The web browser 36 provides an exit button 118 (FIG. 5) for allowing a user to exit from the airline application to the ATM application 38 at any time.

On detecting the user exiting (step 134) from the airline application, the web browser 36 shrinks (step 136) the foreground area 112 to its original size.

To establish a connection with the remote server 12, the web browser uses a URL (uniform resource locator) for specifying the IP address of the remote server 12. The hypertext transfer protocol (HTTP) is the protocol that is used by the browser 36 for communicating with the server 12.

Figure 7:
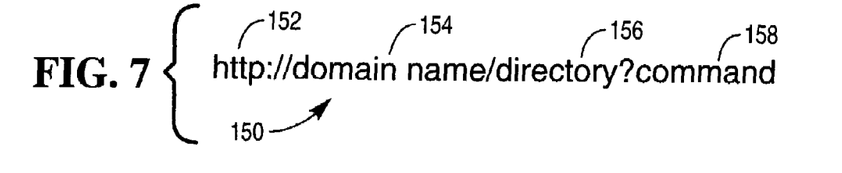
FIG. 7 shows the format of an HTTP URL used to specify a resource on the server of FIGS. 1, 2, and 4.

The URL identifies the domain name of the server and also a resource (web page) on the server. The format of an HTTP URL is shown in FIG. 7. HTTP URL 150 has a protocol field 152 (in this case HTTP), a domain name field (or IP address field) 154, a directory field 156 for accessing a specific file or directory on the server, and a command field 158 for issuing commands to the server.

Figure 8:
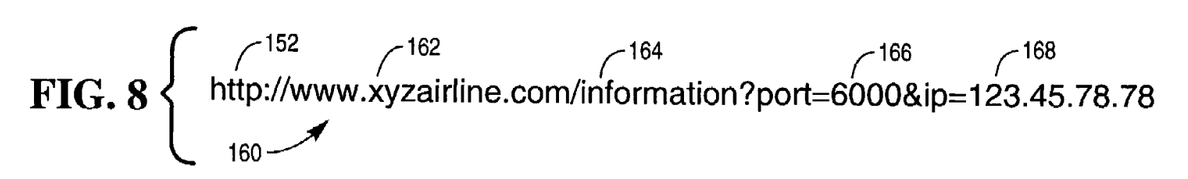
FIG. 8 illustrates one possible URL for accessing a remote database operated by server of FIG. 1.

The hypertext link represented by icon 114 is pre-programmed with the URL that is used to access the third party application; i.e. the domain name used is that of the third party server 12 owned and operated by XYZ Airlines, in this embodiment the domain name is "www.xyzairline.com", as shown in FIG. 8. This ensures that users of the ATM 14*a* cannot by-pass the airline's web page and go to a different web page.

When a user selects the icon 114, web browser 36 sends an initialization URL 160 (FIG. 8) to the web server 44. The initialization URL 160 contains the airline's domain name 162 (in the domain name field 154), the correct directory information 164 to locate the airline's ticket information (in the directory field 156), and terminal specific information (in the command field 158).

The terminal specific information includes details of a server process (server socket) that the terminal application 38 is executing. The details of the server socket include the IP address 168 of the ATM 14*a*, and a port number 166 (in this embodiment "6000") assigned to the server socket by the terminal application 38.

It may not be necessary to include the IP address 168 of the ATM 14*a* in the terminal specific information, as Internet datagrams include the IP address of the sender.

The assigned port number 166 is different to the default port number ("80") used by the web browser 36 for receiving web pages. The assigned port number 166 is a logical channel used by the ATM application 38 to monitor incoming data that is intended for the server socket. The server socket is able to receive a request on the assigned port number 166, operate on the request, and provide a response to the requester.

On receipt of the initialization URL 160 from the web browser 36, the web server 44 creates a session object for that web browser 36 to track the communications between that web browser 36 and the web server 44. Thus, the web server 44 creates and stores a unique session object associated with each web browser 36.

The web server 44 also supplies the web browser 36 with a standard web page for displaying to a user of the ATM 14*a*. The airline's standard web page contains one or more hypertext links to allow the user to navigate through the airline's web site to obtain details of flight destinations, ticket prices, availability, air miles, and such like. As the airline controls the scripts used in their web pages, it can create a custom set of commands that will be used by the browser 36 for requesting information from the web server 44.

The Servlet 104 responsible for creating and forwarding the standard web page to the browser 36 also updates the session object by adding the IP address and assigned port number of the server socket from the initialization URL. Thus, for each web browser, the session object includes the assigned port number 166 and the IP address of the ATM 14*a* executing the browser 36.

When the web server 44 receives a command from the web browser 36, it invokes a Servlet 104 to process that command and generate an appropriate web page for sending back to the web browser 36. When the Servlet 104 is invoked, it accesses the session object for that web browser 36 to obtain session data (such as the IP address) for that browser 36. The Servlet 104 accesses database 100 via the JDBC API 106 and generates HTML pages that include the information retrieved from the database 100; the HTML pages have the graphical format and style of the airline's web site. Thus, a user at the ATM 14a can view information from the airline's database 100 without the terminal application 38 originating the communication.

In addition to sending information to the web browser 36, each Servlet 104 also updates the session object associated with that browser 36. In general, a Servlet 104 will prepare an HTML page incorporating retrieved information from the database 100; whereas, the Servlet 104 will copy the information (but not the HTML page) to the session object. Thus, the session object maintains a copy of the information requested by the web browser 36.

The HTML pages that are sent to the browser 36 by a Servlet 104 will generally contain one or more hypertext links. These hypertext links may contain the URL for another web page (for example, to display general information) or for invoking a Servlet 104 (for example, to process a request for specific information, or to provide a function such as printing specific information).

If the user wishes to print a hard copy of the information at the ATM 14a, then the user selects a hypertext link on an HTML page that offers the print page function. This hypertext link is pre-programmed with a URL that invokes a Servlet 104 for printing the information currently displayed by the server 44. The print page function is not provided by the browser 36 because the browser 36 is not able to send requests to the terminal application 38; the print page function is embedded in the HTML displayed by the browser 36.

The web browser 36 sends the URL of the selected hypertext link to the web server 44. The web server 44 receives this URL and invokes the Servlet 104 identified by the URL. The invoked Servlet 104 accesses the session object to retrieve (1) the currently displayed information, and (2) the IP address and assigned port number of the server socket.

The invoked Servlet 104 then sends a request to the server socket at the assigned port number 166 and IP address.

If a communication is addressed to the port number of the web browser 36 then the terminal application 38 conveys this communication to the browser 36; whereas, if a communication is addressed to the assigned port number 166 then the terminal application 38 conveys this communication to the server socket.

Figure 9:
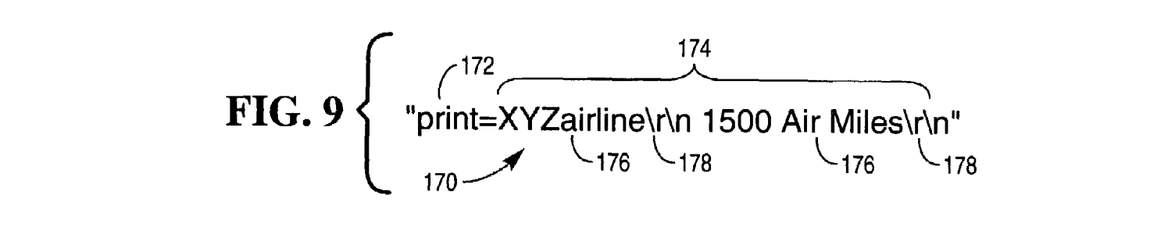
FIG. 9 illustrates a command for requesting use of a facility on an SST shown in FIG. 1.

The server socket is pre-programmed by the financial institution to recognize certain command requests, for example, "print", "receive_deposit", or such like. These command requests correspond to the pre-arranged facilities that the financial institution allows the airline to access at the ATM 14a. Using these pre-programmed command requests, a Servlet 104 can instruct the ATM 14a to provide one or more of the pre-arranged facilities (such as printing the information displayed on the current web page) by sending a facilities request message 170, as illustrated in FIG. 9.

The facilities request message 170 includes a pre-arranged command request 172, and a command operator 174. The command operator 174 may include data 176 (such as the airline's company name) and control characters 178 (such as carriage return or line feed). The facilities request message 170 is a peer-to-peer inter-process communication between a Servlet 104 and the socket server.

On receiving a facilities request message 170, the socket server initiates fulfillment of the request by instructing the appropriate peripheral (for this request the appropriate peripheral is the printer 56) and passing any data 176 and control characters 178 to the peripheral. The facilities request message 170 of FIG. 9 would be printed out as:

XYZairline

1500 Air Miles

Figure 10:
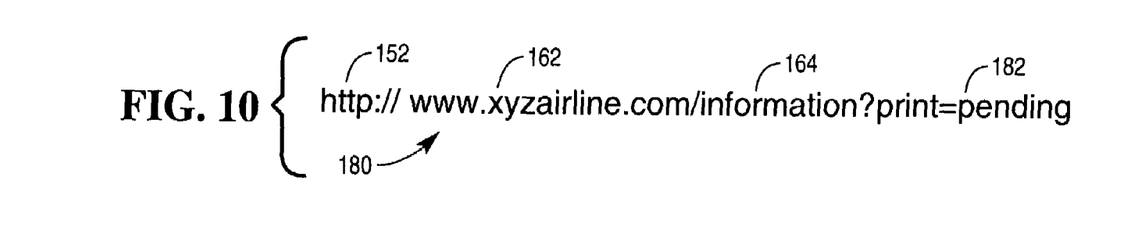
FIG. 10 illustrates a URL sent by an SST of FIG. 1 to the server of FIG. 1 to inform the SST of the status of a request.

As is well known to those of skill in the art, the terminal application 38 performs state of health monitoring of the peripherals (50, 52, 54, 56, 58 in FIG. 3) as they operate. Using this state of health information, the terminal application sends a status URL 180, as illustrated in FIG. 10, to the Web server 44 to inform the server 44 of the current status of the request. The server 44 may use this information to inform the user of the ATM 14a by displaying a message on the foreground area 112 (FIG. 5).

The status URL 180 includes the airline's domain name 162, the correct directory information 164 to locate the airline's ticket information, and a command status 182 in the command field. The command status is a pre-defined string that the server 44 recognizes, such as "print=pending", "print=ok", "print=error", or such like. The meaning of these command status strings is self-explanatory.

Furthermore, because the browser 36 is an embedded component within the terminal application 38, the terminal application 38 is able to monitor usage of the web browser 36, so that if no URL is sent from the browser 36 for a certain time period, the terminal application 38 may display a message on the display 52 asking the user to verify that he still wants to view the airline's web site. If no response is received from the user within a certain time period then the terminal application 38 assumes that the user has abandoned the ATM 14a, and the application 38 shrinks the foreground area window 112 (FIG. 5) to display the background area window 110 (FIG. 5) having the ATM application flow.

When the ATM 14a switches to the background window, the web browser 36 sends a URL to the web server 44 informing the web server 44 that the current session should be terminated. The web server 44 receives this URL and terminates session object associated with the ATM's browser 36. A session represents a user's interaction with the web server 44 from the web browser 36 initiating contact with the web server 44 to the browser 36 terminating contact with the web server 44.

Another advantage of the browser 36 being embedded in the terminal application 38, is that the terminal application 38 is able to monitor all URLs sent from the browser 36. Thus, if a URL does not contain the domain name of the airline (www.xyzairline.com) then the terminal application may block the browser 36 from sending that URL.

Although this embodiment has been described for one SST (ATM 14a) interacting with the server 12, it will be understood that a plurality of SSTs (for example 14a, 14b, 14c) could interact simultaneously with the server 12, each SST 14 having a unique associated session object.

It will now be appreciated that this embodiment of the invention ensures that the resilience of the terminal application 38 is not adversely affected by having a third party application 104 interact with a user because the code for the terminal application 38 is independent of the code for the third party application 104. It will also be appreciated that this embodiment ensures that the terminal application 38 controls all the facilities of the ATM 14a but allows the third party application 104 to make requests for use of some or all of the facilities. This has the advantage that the third party can use the facilities provided by the ATM 14a, but the financial institution does not have to pass control of the facilities to the third party at any time.

Figure 11:
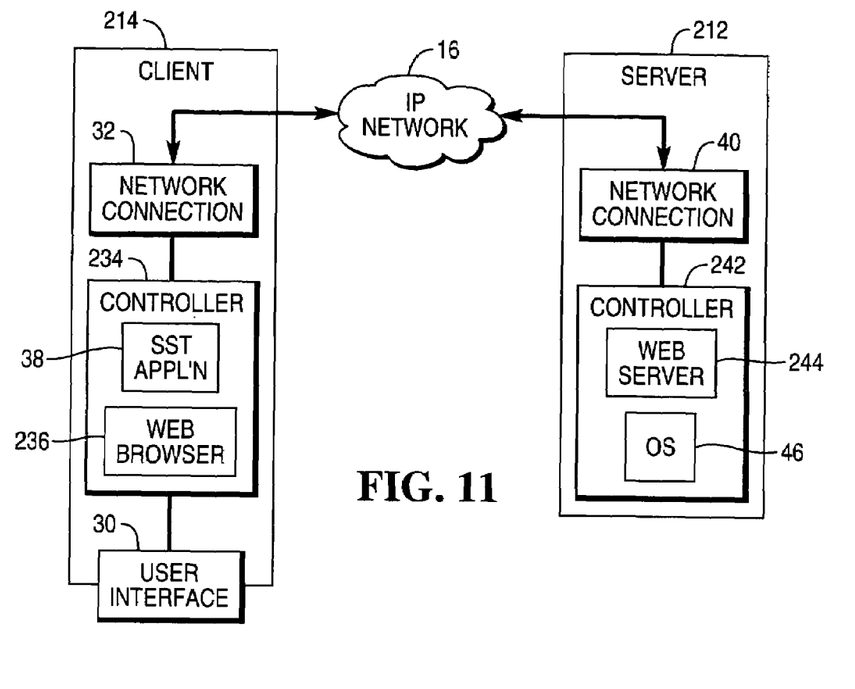
FIG. 11 is a block diagram of a server and a terminal according to an alternative embodiment of the present invention.

Referring now to FIG. 11, which shows an alternative embodiment of the invention, an SST 214 is connected to a server 212 by an IP network 16 such as the Internet. It will be apparent from comparing FIG. 2 with FIG. 11 that the physical arrangement of FIG. 11 is identical to that of FIG. 2; however, in the FIG. 11 embodiment the server 212 and SST 214 interact in a different way to the interaction between the server 12 and the ATM 14 in the FIG. 2 embodiment, as will now be described with reference to FIG. 12.

Figure 12:
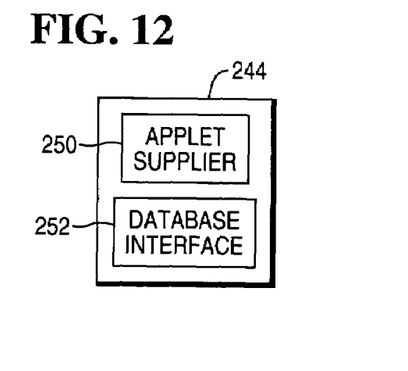
FIG. 12 is a block diagram of a part of the server of FIG. 11.

FIG. 12 illustrates a web server 244 having a server application 250 arranged to supply JAVA (trade mark) applets to a client web browser 236. The client web browser 236 is a Microsoft (trade mark) Internet Explorer browser that is capable of receiving and executing JAVA applets.

An applet is an executable program that is associated with a web page. An applet comprises executable JAVA object bytecodes that are used to provide specific programmed functionality (such as a graphical display) on a client computer. An applet is downloaded from a server by a web browser having an engine (such as a JAVA Virtual Machine) for executing the downloaded applet. The browser executes the applet together with an associated web page.

The screen display of SST 214 is identical to that of ATM 14a of FIG. 5. When a user selects icon 114 (FIG. 5) then the browser 236 sends an initialization URL 160 (FIG. 8) to the web server 242.

On receiving the initialization URL 160, the server 212 conveys the IP address and the port number of the SST 214 to the applet supplier 250. The applet supplier 250 uses this address and port number information to create an applet that is programmed with the server's IP address, the SST's IP address, the SST's assigned port number (not the default port number of the web browser 236), and any parameters needed to access a database. The web server 244 uses a database interface 252 to access the database. The created applet is then appended to a web page and conveyed to the web browser 236.

Figure 13:
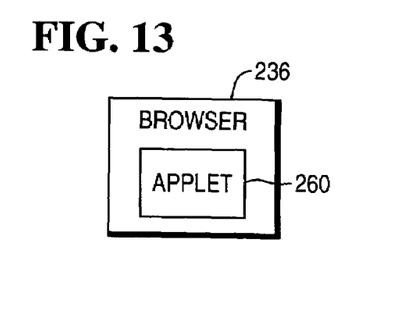
FIG. 13 is a block diagram of a part of the terminal of FIG. 11.

The web browser 236 receives the web page and appended applet from the server 212. The browser 236 displays the web page on the display 52 (FIG. 3) and, as shown in FIG. 13, executes the applet 260 within the context of the browser 236.

As the user interacts with the web page the applet 260 sends requests for information to the web server 244 as necessary to fulfil the user's requests. The web server 244 receives the request, accesses the database to obtain the data, and sends the data to the applet 260. The applet 260 receives the data and generates a new web page including the received data for display by the browser 236. Thus, in this embodiment, the server application (the applet 260) is executed on the SST 214 rather than the server 212; whereas, in the previous embodiment, the server application (Servlets 104) is executed on the server 212.

Some browsers may not allow a downloaded applet to access any server other than the server from which the applet originated. For such browsers, the applet 260 may have to access the server 12 and request that the server 12 sends a facilities request to the ATM 14a on behalf of the applet 260.

Figure 14:
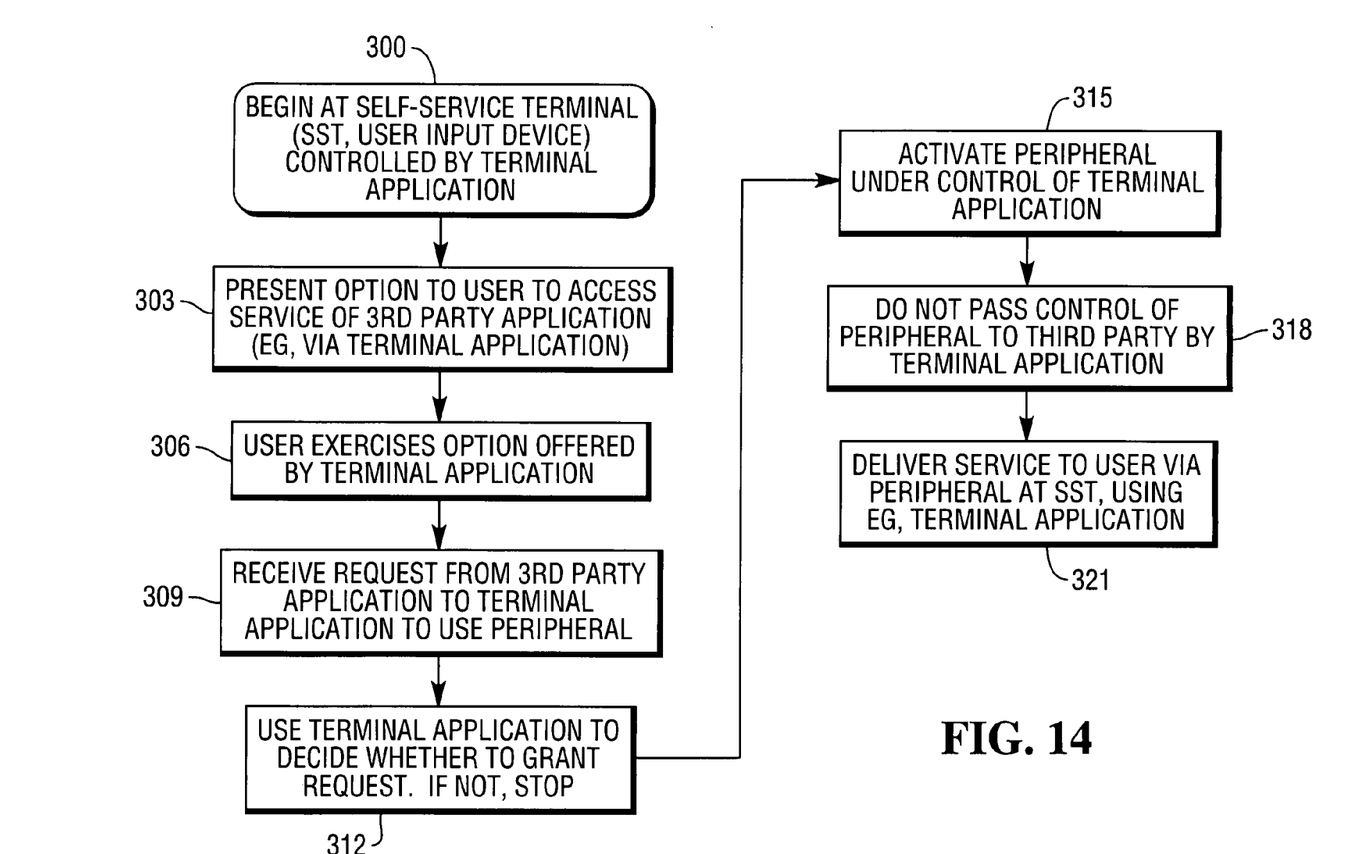
FIG. 14 is a flow chart illustrating processes undertaken by one form of the invention, and undertaken by processes described in claim 39 and others.

FIG. 14 illustrates processes undertaken by one form of the invention. The process begins at block 300, wherein a user initiates a transaction at a self-service terminal, SST. In block 303, the SST presents an option to the user to gain access to a third party application. The airline information discussed above provides an example of the third party information.

In block 306, the user exercises the option. In block 309, the third party application requests permission from the SST to use a peripheral, such as a printer. In block 312, an application at the SST makes a decision on whether to allow the third party application to use the peripheral.

In block 315, the peripheral is actuated, but under control of an application in the SST. Significantly, control of the peripheral is not given to the third party application, as block 318 indicates.

In block 321, the peripheral performs the service requested by the third party application.

Various modifications may be made to the above described embodiments within the scope of the invention, for example, in other embodiments there may be a greater or fewer number of user interface elements. In other embodiments, the network connection 32 may be used to connect to the switching device 22 so that the dedicated switching device connection 78 is not required. In other embodiments, the Servlets may be instantiated under a predetermined set of conditions, for example, when the SST 14 initiates a session with the remote server 12. In other embodiments, the rules for how windows 110 and 112 are displayed and at what point in a transaction a user can access these windows may be different to that described in the above specific embodiments. In other embodiments, different formats of facilities requests may be used than that described, for example, the facilities requests may be encrypted using an encryption technique such as public key encryption.

In one type of embodiment the server application may generate web pages using PERL or CGI scripts. In a second type of embodiment Microsoft (trade mark) active server pages may be used instead of JAVA (trade mark) Servlets. In a third type of embodiment the server application may generate web pages using dynamic HTML. In a fourth type of embodiment the server application may reside on an SST and may generate web pages using active X controls. Other methods of session tracking may be used.

What is claimed is:

1. A method of operating an Automated Teller Machine (ATM), which includes a printer and a web browser, the method comprising the steps of:
   a) maintaining a Uniform Resource Locator (URL) for the printer, which is
      i) an address on the Internet at which the printer is reached, and
      ii) different from any URL assigned to the web browser;
   b) presenting to a user of the ATM an option of accessing a remote third party application to obtain a service from the third party application while the user is at the ATM;
   c) receiving a request from the third party application to use the printer, said request is addressed to the URL of the printer;
   d) using the terminal application to determine whether the request received from the third party application should be granted; and if so
   e) activating the printer under control of the terminal application such that control of the printer
      i) is not passed to the third party application and
      ii) is not passed to the browser.

2. The method according to claim 1, further comprising the step of:
   monitoring ATM usage during operation of the third party application to ascertain whether the user has left the ATM.

3. The method according to claim 1, further comprising the step of:
   sending a response to the third party application to indicate the status of the request received from the third party application.

4. An Automated Teller Machine (ATM), comprising:

a) a web browser and a printer to which is assigned an Internet address comprising a Uniform Resource Locator (URL) different from any URL assigned to the web browser;

b) a terminal application which controls the printer; and c) a controller for (i) receiving a request sent from a remote third party application to the URL, said request asking to use the printer in response to the user accessing the third party application while the user is at the self-service terminal, (ii) using the terminal application to determine whether the request received from the third party application should be granted, and if so (iii) activating the printer under control of the terminal application such that control of the peripheral device is not passed to the third party application and the browser at any time.

* * * * *